United States Patent

Miyadera et al.

Patent Number: 5,431,977
Date of Patent: Jul. 11, 1995

[54] OPTICAL RECORDING MEDIUM

[75] Inventors: Toshiyuki Miyadera; Takashi Chuman; Takashi Yamada; Fumio Matsui, all of Saitama, Japan

[73] Assignee: Pioneer Electronic Corporation, Tokyo, Japan

[21] Appl. No.: 137,994

[22] Filed: Oct. 19, 1993

[30] Foreign Application Priority Data

Nov. 2, 1992 [JP] Japan ................. 4-294320

[51] Int. Cl.⁶ ............................. G03C 1/72
[52] U.S. Cl. ................. 428/64.8; 428/412; 428/500; 428/515; 430/945
[58] Field of Search ............. 428/64, 412, 500, 515, 428/913; 430/945

[56] References Cited

U.S. PATENT DOCUMENTS

| | | | |
|---|---|---|---|
| 4,851,322 | 7/1989 | Inagaki et al. | 430/270 |
| 5,009,987 | 4/1991 | Mihara et al. | 430/495 |
| 5,217,844 | 6/1993 | Fukushima et al. | 430/273 |

*Primary Examiner*—Bruce H. Hess
*Attorney, Agent, or Firm*—Nikaido, Marmelstein Murray & Oram

[57] ABSTRACT

An optical recording medium has a substrate and a recording film provided on the substrate. The recording film contains organic coloring matter and polyvinylbutyral. The organic coloring matter and polyvinylbutyral are dissolved by a solvent and coated on the substrate to form the recording film.

5 Claims, 1 Drawing Sheet

LASER BEAM

OPTICAL RECORDING MEDIUM

BACKGROUND OF THE INVENTION

The present invention relates to an optical recording medium such as a writable disc and readable disc, and more particularly to a recording medium which is improved in weathering resistance, thereby preventing characteristics of information recorded on the recording medium from deteriorating.

In a recording film of a rewritable optical recording medium, it is well known to use organic coloring matter such as cyanine or phthalocyanine.

As a method for writing information on the recording medium, a laser beam is focused on the recording film at a small area and converted into thermal energy so that the characteristic of the recording film is changed to form a pit. In order to properly change the characteristic of the recording film, two sheets of the recording mediums comprising a substrate and a recording film coated on the substrate is prepared. The recording films are disposed opposite to each other, interposing air therebetween, so called air sandwich construction.

A transparent substrate is irradiated with a laser beam for writing information and the pit is formed on the recording film. A laser beam for reading the recorded information has a rather weak power compared with the writing laser beam. The contrast between the pit and the area other than the pit is detected as an electric signal.

Besides the above mentioned recording medium, a recording medium on which information has been already recorded is provided. It is a read only memory (ROM) type recording medium which is widely used in the sound recording field and information processing field. In such a recording medium, it is not necessary to provide the writable recording film and prepits corresponding data to be reproduced are previously formed on a plastic substrate by press. A metallic reflection film made of Au, Ag, Cu, or Al is coated on the substrate and a protection film is covered on the reflection film. The most typical example thereof is a compact disc (CD). The format of writing and reading signal of the CD is standardized and the reproducing device of the CD is widely used as a CD player.

Since the rewritable recording medium uses a laser beam and is in the form of a disc, it is the same as the CD. Therefore, it has developed to adapt the recording medium to be played by the CD player.

However, if the recording medium is left in a space under severe environmental conditions, as high temperature and high humidity, deterioration such as reduction of reflectance of the recording portion, decrease of amplitude, and increase of jitter and error will occur.

SUMMARY OF THE INVENTION

An object of the present invention is to provide an optical recording medium which has high weathering resistance, thereby preventing characteristics of recorded information from deteriorating even if the recording medium is in a severe environmental conditions.

According to the present invention, there is provided an optical recording medium having a substrate and a recording film provided on the substrate, wherein the improvement comprises, the recording film containing organic coloring matter and polyvinylbutyral.

The polyvinylbutyral is contained in the recording film in the ratio of 0.1 to 20 parts by weight to 100 parts by weight of the organic coloring matter.

The organic coloring matter is coloring matter selected from the group consisting of phthalocyanine coloring matter and cyanine coloring matter.

The substrate is made of transparent resin selected from the group consisting of polycarbonate resin and polymethylmethacrylate resin.

The organic coloring matter and the polyvinylbutyral are dissolved by a solvent selected from the group consisting of deacetone alcohol, ethyl cellosolve, methyl cellosolve, isophorone, methanol, and tetrafluoropropanol, and coated on the substrate to form the recording film.

The other objects and features of this invention will become understood from the following description with reference to the accompanying drawings.

BRIEF DESCRIPTION OF DRAWINGS

The single FIGURE is an enlarged sectional view partly showing an optical recording medium according to the present invention.

DETAILED DESCRIPTION OF THE PREFERRED EMBODIMENT

Figure 1:
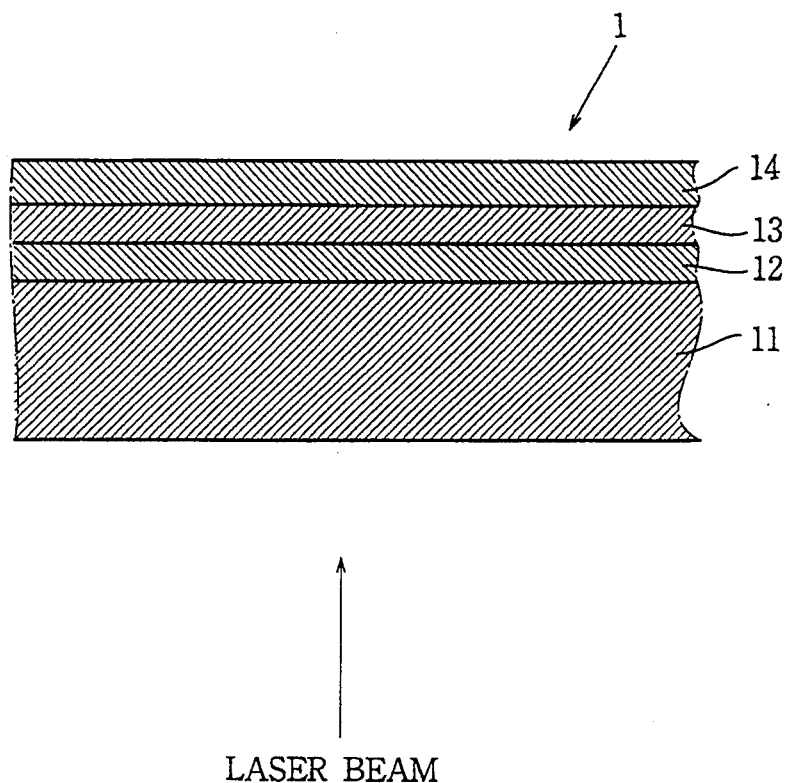

Referring to the FIGURE showing an optical recording medium of the present invention, in the embodiment of the present invention, a writable optical disc conformable to the format of the CD will be described. An optical recording medium 1 comprises a light-transmissible substrate 11 in the form of a disc, a recording film 12 coated on the substrate 11, a reflection film 13 coated on the recording film 12, and a protection film 14 covering the reflection film 13.

The substrate 11 is made of transparent material such as polycarbonate (PC) resin or polymethylmethacrylate (PMMA) resin and formed by injection molding in consideration of productivity. A coaxial tracking pregrooves or a spiral tracking pregroove is formed on the substrate 11 at the underside.

Alternatively, the substrate may be formed by the photo-Polymer method. The thickness of the substrate 11 is about 1.0 to 1.5 mm.

The recording film 12 coated on the substrate 11 contains organic coloring matter, for example, phthalocyanine coloring matter. The phthalocyanine coloring matter is represented by the general formula [1] as follows.

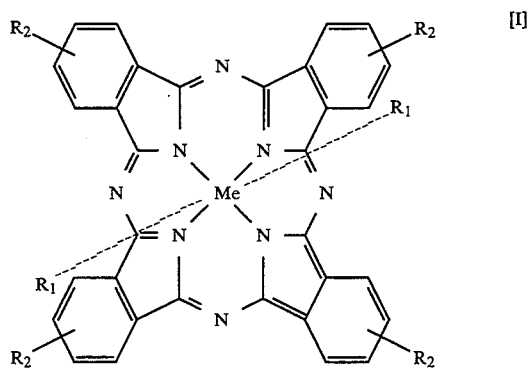_ wherein $R_1$ is selected from alkyl group which may have a substituent, hydrogen atom, halogen atom, hydroxyl group, $-OR^{15}$, $-SR^{15}$, $-TeR^{15}$,

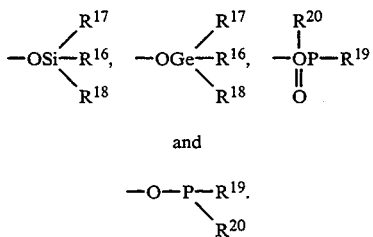

and $$-O-P\diagup_{R^{20}}^{R^{19}}.$$

$R^{15}$ is selected from alkyl group which may have a substituent, aryl group which may have a substituent, cycloalkyl group which may have a substituent, and polyether group.

$R^{16}$, $R^{17}$, and $R^{18}$ may be either the same or the difference and are selected from alkyl group which may have a substituent, cycloalkyl group which may have a substituent, aryl group which may have a substituent, alkoxy group which may have a substituent, aryloxy group which may have a substituent, polyether group, hydroxyl group, and hydrogen atom.

$R^{19}$ and $R^{20}$ may be either the same or the difference and are selected from alkyl group which may have a substituent, cycloalkyl group which may have a substituent, and aryl group which may have a substituent.

$R_2$ is selected from alkyl group which may have a substituent independently, alkoxy group which may have a substituent, heterocyclic residue which may have a substituent, halogen atom, nitro group, cyano group, or sulfonic group.

Me is a metal. Particularly, Si, V, Fe or Al is preferable.

In place of the phthalocyanine coloring matter, cyanine coloring matter may be used.

Furthermore, the recording film 12 contains polyvinylbutyral which is a resin synthesized polyvinyl alcohol with butyraldehyde to be reacted in the presence of acid catalyst. The polymerization degree is about 200 to 1500 and butylation is about 57 to 70 mol %.

The polyvinylbutyral is contained in the recording film in the ratio of about 0.1 to 20 parts by weight, preferably 1 to 10 parts by weight to 100 parts by weight of the organic coloring matter. If the value of the polyvinylbutyral exceeds 20 parts by weight, deterioration of the recording signal such as jitter and error will occur. If the value is less than 0.1 parts by weight, weathering resistance can not be improved.

The organic coloring matter and the polyvinylbutyral are dissolved by a solvent and coated on the substrate by a normal method such as spin coating so that the recording film is formed. The thickness of the film is about 10 to 1000 nm, preferably 100 to 500 nm. If the thickness is less than 10 nm, the recording film lacks recording sensitivity. If the thickness exceeds 1000 nm, reflectance becomes insufficient.

The solvent is selected from such a material as to melt polyvinylbutyral and the coloring matter and as not to melt the substrate. For example, deacetone alcohol, ethyl cellosolve, methyl cellosolve, isophorone, methanol, or tetrafluoropropanol is used.

The reflection film 13 coated on the recording film 12 is made of metal such as Au, Al, Ag or Cu and coated by vacuum deposition, cathode sputtering, or ion plating. The thickness of the film 13 is about 0.02 to 2.0 μm.

As the protection film 14, a resin hardened by ultraviolet ray is used and covered by spin coating. Alternatively, epoxy resin, acrylic resin, silicon or urethane resin is used. The thickness of the film 14 is about 0.1 to 100 μm.

An interlayer such as a protection film or an enhancement film may be provided between the substrate 11 and the recording film 12 and between the films 12 and 13. A reflection preventing film may be provided on the substrate 11.

In operation, the disc is rotated and the irradiated with a laser beam in the form of pulses. A part of the recording film is melted and removed so that pits are formed. The pits are irradiated with the laser beam at the reproduction of the disc and read by detecting the difference between the injected light and the reflected light.

EXAMPLE

Phthalocyanine coloring matter specified by the following formula and polyvinylbutyral are melted in the solvent of diaceton alcohol to make a solution for the recording film. The concentration of phthalocyanine is 65 mg/ml and the concentration of polyvinylbutyral is 6 mg/ml. The solution is coated on the substrate 11 which is made of polycarbonate having 12 cm in diameter and 1.2 mm in thickness by spin coating to the thickness about 2500 Å (optical density is about 1.4 Abs). Thereafter, the coated solution is baked at 70° C., for 10 min so that the recording film 12 is formed.

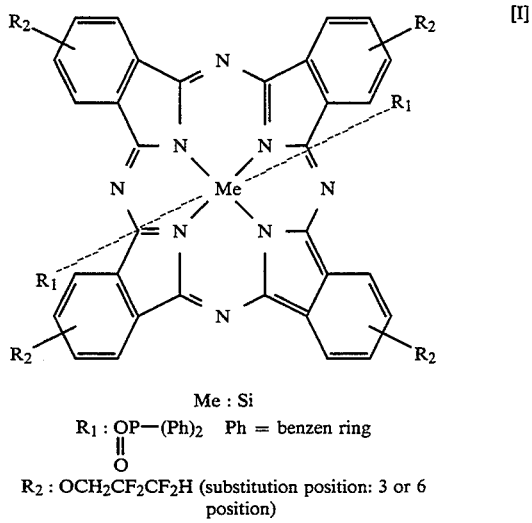

Me : Si
$R_1$ : $\underset{O}{\overset{\|}{OP}}$—(Ph)$_2$    Ph = benzen ring
$R_2$ : OCH$_2$CF$_2$CF$_2$H (substitution position: 3 or 6 position)

The reflection film 13 made of Au is coated at the thickness 1000 Å by vacuum deposition of resistor heating type. The protection film 14 made of ultraviolet ray hardening acrylate resin is covered at the thickness about 5 μm.

Comparative Example

The composition of the comparative example is the same as the present invention, except for the polyvinylbutyral.

Test

In the two examples, an EFM signal is recorded respectively under recording conditions as follows.

L.V. (linear velocity)=1.4 m/s, λ=785 nm, N.A.=0.5, and recording power of the laser beam=9.0 mW. The examples are left in the environmental condition at 70° C., 90% RH for 1000 hours.

Thereafter, the signal is reproduced under reproducing conditions as follows.

L.V. (linear velocity)=1.4 m/s, λ=778 nm, N.A.=0.45, and reproducing power of the laser beam=0.3 mW. The aging of block error rate (BLER) of each example is measured.

The following table shows the results of the test.

TABLE

|  | Initial BLER | BLER after 1000 hours |
|---|---|---|
| Example of the present invention | $2 \times 10^{-3}$ | $2 \times 10^{-3}$ |
| Comparative example | $2 \times 10^{-3}$ | 1 |

From the foregoing, the effect of the present invention is evident. Namely when the examples are left in the environment at high temperature and humidity for a long time, the BLER of the comparative example is increased 1000 times as many as the initial value. No difference is found out in the example of the present invention.

In accordance with the present invention, the recording film of the disc contains organic coloring matter and polyvinylbutyral. Consequently, characteristics of recorded information is not deteriorated, thereby improving the weathering resistance.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An optical recording medium comprising a substrate and a recording film disposed directly on the substrate, wherein the
   the recording film comprising polyvinylbutyral and organic coloring matter consisting essentially of a member selected from the group consisting of phthalocyanine coloring matter and cyanine coloring matter.

2. The recording medium according to claim 1 wherein
   the polyvinylbutyral is contained in the recording film in the ratio of 0.1 to 20 parts by weight per 100 parts by weight of the organic coloring matter.

3. The recording medium according to claim 1 wherein:
   the substrate comprises a transparent resin selected from the group consisting of polycarbonate resin and polymethylmethacrylate resin.

4. The recording medium according to claim 1 wherein
   said organic coloring matter and said polyvinylbutyral are deposited on said substrate from a solvent selected from the group consisting of deacetone alcohol, ethyl cellosolve, methyl cellosolve, isophorone, methanol, and tetrafluoropropanol.

5. A method of increasing the weather resistance of an optical recording medium comprising a) a substrate, b) a recording medium, comprising a coloring film disposed on said substrate, said selected from the group consisting of a cyanine and a phthalocyanine compound, c) a reflection film disposed on said recording film and, d) a protection film disposed on said reflection film, which method of increasing weather resistance comprises combining said coloring medium with polyvinyl butyral resin.

* * * * *